United States Patent [19]
van Lengerich et al.

[11] Patent Number: 6,149,965
[45] Date of Patent: Nov. 21, 2000

[54] CEREAL PRODUCTS WITH INULIN AND METHODS OF PREPARATION

[75] Inventors: Bernhard van Lengerich, Plymouth; Merle K. Larson, Dassel, both of Minn.

[73] Assignee: General Mills, Inc., Minneapolis, Minn.

[21] Appl. No.: 09/005,675

[22] Filed: Jan. 12, 1998

[51] Int. Cl.$^7$ .................................... A23L 1/164
[52] U.S. Cl. .................. 426/620; 426/621; 426/619; 426/622; 426/615
[58] Field of Search .................. 426/620, 619, 426/621, 622, 615

[56] References Cited

U.S. PATENT DOCUMENTS

| | | | |
|---|---|---|---|
| 3,978,236 | 8/1976 | Sair et al. | 426/445 |
| 4,348,379 | 9/1982 | Kowalsky et al. | 424/34 |
| 4,568,557 | 2/1986 | Becker et al. | 426/618 |
| 4,777,045 | 10/1988 | Vanderveer et al. | 424/195.1 |
| 4,871,574 | 10/1989 | Yamazaki et al. | 426/622 |
| 5,024,996 | 6/1991 | Ringe | 514/54 |
| 5,026,689 | 6/1991 | Ringe et al. | 514/57 |
| 5,063,078 | 11/1991 | Foehse | 426/618 |
| 5,151,283 | 9/1992 | Foehse et al. | 426/93 |
| 5,176,936 | 1/1993 | Creighton et al. | 426/618 |
| 5,182,127 | 1/1993 | Schwab et al. | 426/241 |
| 5,258,196 | 11/1993 | Lohan et al. | 426/560 |
| 5,275,830 | 1/1994 | Smith | 426/93 |
| 5,721,004 | 2/1998 | James | 426/573 |
| 5,776,524 | 7/1998 | Reinhart | 426/2 |

FOREIGN PATENT DOCUMENTS

| | | |
|---|---|---|
| 2198681 | 2/1997 | Canada . |
| 2198823 | 2/1997 | Canada . |
| 850569 | 1/1998 | European Pat. Off. . |
| 850 569 | 7/1998 | European Pat. Off. . |
| 399046 | 7/1997 | Russian Federation . |
| 2291580 | 1/1996 | United Kingdom . |

OTHER PUBLICATIONS

Smits et al., "Bulking Agents", Presented at IBC Bulking Agents Conference, Atlanta, pp. 1–8, Mar. 13, 1991.
Patent Abstracts of Japan, vol. 011, No. 075 (C–408), dated Mar. 6, 1987 & JP 61 231050 Dated Oct. 1986.
"Knusprig und Gesund. Getreideextrudate Mit Inulin und Oligofruktose" pp. 60–62, vol. 28, No. 5, 1996.
"Extruded Breakfast Cereals with Improved Bowl Life", p. 475, XP000726597, No. 399, Jul. 1997.
"Food Ingredients and Analysis International", No. 57, Database FSTA, XP0002100471, Jan. 1998–Feb. 1998.
"Edible Coating Providing Moisture Control for Baked Goods" p. 156, No. 406, XP000772318, Feb. 1998.
"Advances in Cereal Food" International Food Information Service, XP–002100471, see abstract, Jan./Feb. 1998.
Feb. 1997 "Inulin–A "Good–for you" Fat Replacer, Texture Modifier".
R.F. Silva Oct. 1996 Use of Inulin as a Natural Texture Modifier pp. 792–794.
Nov. 1996 "Innovate with Raftiline".
F. Brighenti 1995 Proceedings of $7^{th}$ FENS European Nutrition Conference, Vienna.

*Primary Examiner*—Chhaya D. Sayala
*Attorney, Agent, or Firm*—John A. O'Toole; Douglas J. Taylor; Everett G. Diederiks

[57] ABSTRACT

Disclosed are cooked dried farinaceous food products such as cooked cereal doughs, ready-to-eat cereals and grain based snacks fabricated from such cooked cereal doughs containing high levels of soluble fiber supplied at least in part by inulin or other β-2 fructofuranose. The cereals contain about 0.1 to 17% added inulin. The inulin ingredient can be incorporated into the dough and/or topically applied. Also provided are methods for preparing such cooked cereal doughs and finished farinaceous products.

34 Claims, No Drawings

CEREAL PRODUCTS WITH INULIN AND METHODS OF PREPARATION

FIELD OF THE INVENTION

The present invention relates to food products and to their methods of preparation. More particularly, the present invention relates to high fiber, grain based cereal products and to their methods of preparation.

BACKGROUND

R-T-E (Ready-to-eat) cereals are popular packaged goods food items. R-T-E cereals exist in large numbers of varieties. R-T-E cereals, especially whole grain, are known as good sources of fiber. A good description of the literature pertaining to the health discussion on the role of fiber is found in U.S. Pat. No. 4,777,045 (issued Oct. 11, 1988 to Vanderveer et al. and is entitled High Bran Snack) which is incorporated herein by reference.

In view of the health interest in fiber, high fiber cereals are increasingly popular. These cereals contain added levels of fiber sources, especially corn and wheat bran, and range generally from about 2–5 g fiber/oz cereal. Generally, the fiber is predominantly of the insoluble type. Some cereals are formulated from all bran sources and can contain up to 8–10 g/oz fiber. High fiber cereals using purified insoluble fiber sources and artificial sweeteners can even contain as high as 8–13 g fiber/oz of cereal.

While popular, high fiber cereals are not without disadvantages. The primary concern is with the organoleptic qualities of the R-T-E cereal. Generally, as the concentration of fiber increases, the starchy components decrease, adversely affecting the cereal's organoleptic and physical properties. Cereals high in insoluble fiber are often dry, exhibit short bowl lives and yield highly frangible food pieces.

Other high fiber food products containing other fiber sources are well known. For example, U.S. Pat. No. 4,568,557, to Becker et al., discloses a snack food product prepared by premixing a dietary fiber with a food grade oil; premixing a compound coating containing a fractionated fat, sweetener, milk solids, yogurt, and a flavoring agent; blending the two pre-mixtures and adding a cereal product and a dried fruit or nut for flavor; and extruding the resulting mixture into a desired shape.

European patent application No. 0068229, to Kleinert, discloses the addition of the seed coats (episperm) of cocoa beans in finely powdered form, to dough, bread, snacks, and chocolate to increase bulk and stimulate the intestinal tract.

U.S. Pat. No. 4,348,379, to Kowalsky, discloses a dietetic composition for natural digestion regulation containing whole fleawort seeds (Semen psyllii totum) whole linseed, wheat bran, lactose, a binding agent based on natural rubber, flavor and food color additives. The preferred binding agent is gum arabic.

While most fiber rich R-T-E cereals have higher levels of insoluble fibers, present consumer interest is focused upon cereals containing oat bran which is a rich source of soluble fiber. There is a growing awareness of the health benefits to people associated with soluble fiber consumption, especially reductions in blood serum cholesterol, i.e., antihypercholesterolemic benefits. Unfortunately, cereals high in soluble fibers typically are gummy or slimy upon consumption.

Several patents teach the use of psyllium for use in R-T-E cereals. (See, for example, U.S. Pat. No. 5,026,689 entitled "R-T-E Cereal With Psyllium," issued Jun. 25, 1991 to M. Ringe). Psyllium is a good source of soluble fiber. The whole wheat based flake R-T-E cereals therein described are of high eating quality even though containing high levels of soluble fiber by virtue of particular insoluble to soluble fiber ratios. Notwithstanding the improvements in R-T-E cereal flavor and texture, commercial products based upon the '1689 patent have met with limited consumer acceptance.

While it is difficult to provide even a single type of fiber fortified R-T-E cereal, such as a whole wheat flake that exhibits acceptable texture and flavor to consumers, it is even more difficult to provide a wide variety of R-T-E cereals fortified with high levels of soluble fiber.

The present invention is directed towards the provision of an improved high fiber R-T-E cereal with superior organoleptic attributes or qualities. Surprisingly, the present invention provides such a superior quality high fiber R-T-E cereal which nonetheless contains a high concentration of soluble fiber. The present invention resides in part in the particular selection of inulin as the soluble fiber source.

Inulin is a well known material long used as a food supplement. Inulin is a carbohydrate material derived from a variety of crops importantly from Jerusalem artichoke and chicory. However, inulin is known for use as a prebiotic, that is, a food material that is metabolized in the intestine by desirable bacteria such as bifidus and lactobaccilus. The promotion of desirable intestinal flora is thought to be related to a variety of health benefits.

Surprisingly, a wide variety of high soluble fiber R-T-E cereal products can be provided that are almost indistinguishable in taste and texture from their counterparts that are not fortified with fiber when that fiber is supplied by inulin. Such high fiber high quality R-T-E cereals can be provided from cooked cereal doughs that are fortified with soluble fiber provided by inulin within certain concentrations. In its method aspect, the present invention provides methods for preparing such novel R-T-E cereal products.

SUMMARY OF THE INVENTION

The present invention provides cooked cereal compositions fortified with inulin and dried cereal finished food products fabricated therefrom as well as methods for preparing such fortified cooked cereal compositions and dried cereal finished food products.

The dried cereal finished products are fabricated from cooked cereal doughs comprising conventional cereal ingredients and about 3 to 10% (i.e., up to about 3 g/oz) of added or supplemental inulin. Notwithstanding concentrations of the inulin soluble fiber and the absence of added fat, the finished fortified cereal products are not only organoleptically desirable but almost indistinguishable from their unfortified counterparts.

In its method aspect, the present invention resides in methods for preparing the present inulin containing compositions and finished R-T-E products prepared therefrom. In one embodiment, the methods essentially comprise A. providing a cooked cereal dough or mass containing inulin; B. forming the cereal dough into pieces; and C. drying the cereal pieces to form the present grain based finished food products fortified with inulin. In another embodiment all or at least a portion of the inulin is topically applied to the piece prior to finish drying.

DETAILED DESCRIPTION OF THE INVENTION

The present invention relates to cooked cereal doughs containing defined levels of inulin or other oligo saccharides, to finished dried grain based products prepared therefrom and to methods for their preparation. Each of these product constituents, as well as methods for their preparation and use are described in detail below. Throughout the specification and claims, percentages are by weight and temperatures in degrees Fahrenheit, unless otherwise indicated.

Providing An Inulin Containing Cooked Cereal Dough

In the preferred embodiment, the present methods essentially comprise a first step of providing a cooked cereal composition such as a cereal dough or cereal mass containing inulin within the herein specified ranges.

As is well known, a cooked cereal dough can be prepared by blending various dry cereal ingredients together with water and cooking to gelatinize the starchy components and to develop a cooked flavor. The cooked material can also be mechanically worked to form a cooked cereal dough. The cooking and mechanical work can occur simultaneously or sequentially. The dry ingredients can also include various additives such as sugar(s), salt and mineral salts, e.g., trisodium phosphate, and starches. In addition to water, various liquid ingredients such as corn (maize) or malt syrups can be added. A cooked cereal mash is quite similar except that larger sized particles such as whole grains or cut grains are cooked rather than cereal flour ingredients.

An essential component of the present cereal compositions is a starchy cereal(s). The starchy cereal component can comprise any conventionally employed starchy cereal or, synonomously, farinaceous material, for use in a ready-to-eat cereal. Exemplary suitable starchy cereals include cereal grains, cut grains, grits or flours from wheat, rice, corn, oats, barley, rye, triticale or other cereal grains and mixtures thereof. The flours can be whole flours or flour fractions such as with the germ fraction or husk fraction removed or, alternatively, brans. Of course, the R-T-E cereal art is well developed and the skilled artisan will have no difficulty selecting suitable farinaceous materials for use herein.

The starchy cereal component(s) can comprise from about 40 to 99% (dry basis) of the cooked cereal dough composition. Better results in terms of organoleptic attributes and reductions in R-T-E cereal piece frangibility are obtained when the cereal ingredient(s) comprises about 75 to 95% of the cooked cereal dough composition. For best results the cereal ingredients comprise about 80 to 95% of the present cereal products.

The cooked cereal dough additionally comprises about 10 to 55% moisture. The amount of moisture depends, in part, upon the particular cereal ingredients, desired finished products, cooking equipment and techniques employed.

Broadly, the present invention provides food compositions that essentially comprise a cooked cereal dough or cereal mass containing or fortified with inulin. The food compositions essentially comprise about 90 to 97%, preferably about 92 to 97% of the cooked cereal dough (dry weight basis) and the balance inulin. Such fiber fortified cooked cereal doughs are useful for fabrication into finished dried grain based food products such as R-T-E cereals and grain based snack products.

Inulin is well known and is a staple of commerce. Inulin is a particularly useful β-2-fructofuranose material.

Generally, inulin is the clean, dried fibrous material which is separated by extraction from, for example, chicory, onions and Jerusalem artichokes and other common plant sources. Inulin is available in various commercial grade varieties. Pure inulin is commercially available from, for example, Rhone-Poulenc in the U.S. under the trade name RAFTILINE® and from Imperial Suicker Unie, LLC in Europe. Pure inulin has an average degree of polymerization ("DP") of about 9 to 10. Less preferred for use herein are less pure inulin source materials such as a dried Jerusalem artichoke flour, deflavored onion flour and mixtures thereof. Also useful herein are oligofructose materials available under the RAFTILOSE trade name from Rhone-Poulenc. Such materials are plant derived and have a DP of about 2 to 7, i.e., with fructose claims of up to about seven fructose units.

In still other useful variations, manose can be substituted for the fructose in full or partial substitution, i.e., oligomanans. In still other useful variations, other oligomers can be used with similar degrees of polymerization that are from monomers of monosaccharides selected from the group consisting of glucose, xylose, aribinose, and mixtures thereof (i.e., DP 2-60).

The β-2-fructofuranose material useful herein includes oligomers and polymers thereof. Particularly useful in terms of cost and availability are inulin and fructoogliosaccharides ("FOS") and mixtures thereof.

FOS materials are also available commercially such as from GTC Nutrition Company, Westminster, CO. FOS materials have an average degree of polymerization ("DP") ranging from about 2–4 polyfructans. Due to their lower molecular weight, the FOS materials have a greater solubility in water. FOS materials have a slight sweetness to their taste. A further advantage is that the FOS materials when topically applied form a clear, almost undetectable coating. As a result, FOS materials are especially suitable for topical application.

While in the balance of the present description the use of inulin is described, the skilled artisan will appreciate that other β-2 fructofuranose materials described above can be used in full or partial substitution for the particular inulin materials described as can be other oligosaccharides, e.g., oligomanans.

The present cooked cereal compositions essentially comprise about 1% to 10% by weight (dry basis), i.e., up to about 3 g/oz, of added inulin. Better results in terms of balancing the health benefits efficacy, especially antihypercholesterolemic activity, balanced with acceptable organoleptic attributes are obtained when the added inulin is present at a concentration range of from about 0.1 to 8% by dry weight of the cereal, preferably about 1 to 8%, and for best results about 5 to 8%. Since the natural inulin content of wheat can range from about 1 to 3%, the total β-2 fructofuranose content of the finished product will be the sum of the natural or native inulin associated with the cereal constituents plus the added pure inulin or other supplemental β-2 fructofuranose material.

An advantage of the present invention is that inulin can be used in connection with a wide variety of dried finished grain based products fabricated from cooked cereal doughs such as R-T-E cereal products. Such products can vary widely, not only in composition, but also in final physical form. Thus, the present invention can be used to prepare R-T-E cereals in the form of shreds, biscuits and puffs as well as the preferred flake form.

Moreover, while the invention finds particular suitability for use in connection with the provision of R-T-E cereals fabricated from cooked cereal doughs, the skilled artisan will appreciate that the present inulin fortified cooked cereal doughs can find applicability for use in connection with other grain based food products such as grain based snack products. For example, the inulin fortified cooked cereal doughs can be formed into suitably sized, shaped and partially dried pellets or half products. These half products are useful intermediate products. Finished grain based snack products are usually provided by the deep fat frying or other puffing of the pellets (e.g., hot air or microwave heating) of partially dried half products fabricated from cooked cereal doughs. An advantage of half products is that they can be produced in bulk in one location and thereafter fried in one or more finish operations to form the finished snack products. Not only are shipping costs reduced due to the reduced volume of the half products compared to the finished products but also breakage of the finished product is reduced. Also, the present invention can be used to provide pretzel snack products fortified with inulin.

The present compositions can optionally include additional or supplemental sources of soluble fiber in addition to inulin. One possible, although expensive, source of soluble fiber is to employ commercially available high methoxyl pectin. While desirable due to its cost and availability, the utilization of pectin aggravates the problems of providing organoleptically acceptable cereal products. Accordingly, when pectin is used to provide additional soluble fiber, generally lower amounts of soluble fiber are preferred. Other useful sources of soluble fiber include oat bran, guar gum, carboxymethylcellulose, psyllium and mixtures thereof.

If present, each of these supplemental soluble fiber sources can comprise from about 0.1 to 6% dry weight basis, and, preferably, when used in addition to inulin, about 1 to 5% of the present compositions, and for best results about 1 to 2%.

Also useful herein are non-cereal fiber sources including cellulose flour, cellulose fiber, sugar beet fiber, etc. Sugar beet fiber can comprise up to 80% total dietary fiber with about 20% soluble fiber and 60% insoluble fiber. If employed, sugar beet fiber can comprise about 0.1 to 5% (dry weight) of the present products.

The present cooked cereal dough compositions and dried finished products prepared therefrom can additionally include one or more cereal bran fractions as a supplemental fiber ingredient. Among cereal brans, oat bran is an especially desirable optional ingredient in the present cereal compositions. Oat bran has a fiber fraction in addition to the high cereal or starchy fraction. Oat bran is a concentrated source of a soluble fiber and can comprise at least 6% soluble fiber (about 1.7 g/oz) as well as at least 6% insoluble fiber (about 1.7 g/oz). Accordingly, inclusion of oat bran into the present R-T-E cereal composition simultaneously can provide the present essential starchy cereal component, a supplemental soluble fiber component, and an insoluble fiber component. If desired, the cereal bran ingredient can comprise about 1 to 50% (dry weight) of the cooked cereal dough. High fiber products will preferably contain about 25 to 40% supplemental cereal bran. Low fiber products can preferably contain about 1 to 15% supplemental cereal bran.

If desired, the present cereal dough composition can additionally comprise about 0.1 to about 20% (dry weight) by weight sugar(s) or, synonomously herein, nutritive carbohydrate sweetening agents. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained, especially for R-T-E cereal products, when the sugar(s) component comprises from about 1% to about 10% by weight of the composition.

In a preferred embodiment for ready-to-eat cereals, the present cereal compositions are further essentially defined in part by low fat levels, i.e., the present cereals do not comprise added or absorbed fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions should be less than about 3%, preferably less than about 2%. Preferably, the R-T-E cereal is substantially free of any fat or oil incorporated into the cooked cereal dough. Such "added fat" is to be distinguished from "absorbed fat" that is picked up during deep fat frying used to prepare finished snack products herein. In more preferred embodiments, R-T-E cereals are further characterized as free of any absorbed fat.

If desired, the present cereal dough composition can additionally include a variety of materials designed to improve the aesthetic, organoleptic or nutritional qualities of the cereal. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 2% dry weight of the cereal composition.

One especially useful material is common salt. Desirably, the salt comprises about 0.1 to 2%, preferably about 0.5 to 1.0% of the cereal composition.

Still another highly preferred ingredient is a malt syrup flavor ingredient. The malt syrup comprises about 1 to 8% (dry basis), preferably about 2 to 5%.

Fiber, especially insoluble fiber, is believed to adversely affect selected mineral and vitamin absorption. Accordingly, in highly preferred embodiments, in particular, the present R-T-E cereals can be fortified with bioavailable sources of calcium, iron, riboflavin and the like. These mineral fortifiers can be incorporated into the cereal compositions directly. It is also desirable to vitamin fortify the present R-T-E cereals, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein.

It is an advantage herein that inulin can be subjected to, but does not require, a cooking step. Thus, the inulin material can be added to the dry materials that are cooked and worked to form a cooked cereal dough or can be added subsequent to the formation of a cooked cereal dough, or both.

The present raw cereal components and other ingredients can be cooked and worked to form the present cooked cereal doughs by conventional cooked cereal dough preparation methods. The total moisture addition is controlled to provide a cooked cereal comprising about 10 to 60% moisture, preferably about 25 to 35% moisture.

The cereal dough cooking step can be practiced using a batch, atmospheric cooker and a low pressure extruder cooker especially those equipped with a conditioner precooker, or a twin screw extruder. The cereal is cooked with steam and sufficient amounts of added water for times and at temperatures sufficient to gelatinize the cereal starch and to develop desired levels of cooked cereal flavor.

Thus, in one preferred embodiment, the inulin can be added to the cereal and other dry ingredients prior to cooking. The inulin bearing dry blend of cereal ingredients can then be combined with water, heated to cook and gelatinize the starchy constituents and mechanically worked to form a cooked cereal dough fortified with inulin.

In one variation of this embodiment, the cereal ingredients are cooked in a cooker such as a single or twin screw cooker extruder to form a cooked cereal dough.

In another variation, a cooked cereal dough is prepared that does not include inulin. In this variation, the inulin is added afterwards to the dough. The inulin can be added in solid form or dissolved in small or minimal amounts of water and admixed with the cooked cereal dough to form the inulin fortified dough. Conveniently, the inulin can be worked into the dough in a pellet forming device that transforms the dough into individual sized and shaped pieces.

In still another variation, a portion of the inulin is added with the other dry cereal ingredients that are admixed with water, cooked and worked to form a partially fortified dough. Then, the balance of the inulin can be admixed with the dough to prepare an inulin containing dough fortified to desired levels.

In certain embodiments, the cooked cereal dough can be puffable such as by deep fat frying, microwave heating, gun puffing, jet zone heating, etc. More easily puffed doughs can have high levels of amylopectin-type starch supplied either by selection of high amylopectin containing starchy cereal materials, or by addition of pure amylopectin starches or both. By high amylopectin level herein is meant greater than 20% up to about 80% by weight.

Forming into Desirably Shaped and Sized Pieces

The present methods further essentially comprise the step of forming the dough into individual pieces of desirable shape and size. Conventional techniques and equipment can be employed to practice this step and the skilled artisan will have no difficulty in selecting those suitable for use herein.

The present cereal compositions can be fabricated into any of a variety of common R-T-E cereal forms including, shreds, biscuits, flakes, or any common R-T-E cereal or cereal based snack product form, shape or size. The present cereal compositions can also be formulated and fabricated so as to provide puffed cereals of various shapes and sizes such as "O's". Especially desirable for use herein are flakes, especially toasted flakes.

For example, a great number of R-T-E cereals and snack products are prepared from cooked cereal doughs that are formed into pellets. The cooked cereal dough can be fed to a pellet former to form pellets. For example, in the preparation of R-T-E cereals in flake form, the pellets are sized to have a pellet count of about 35 to 50 per 10 g and a moisture content of 16 to 20%.

In the preparation of a flaked R-T-E cereal, the pellets can be partially dried to moisture contents of about 18 to 20%. The pellets can then be formed into "wet" flakes having a thickness of about 380 to 635 $\mu$m (0.015 to 0.025 inch), preferably while warm 76.6 to 87.8° C. (170 to 190° F.) to form desirably shaped and sized wet flakes.

In still another variation, the dough can be sheeted to form sheets of dough (e.g., 25 to 800 microns in thickness) and the individual pieces formed by cutting the sheet into individual pieces or by stamping out shaped pieces from the dough sheet.

In still another variation, the cooked cereal dough can be extruded through a die imparting a desired peripheral shape to form an extrudate cooked cereal dough rope. The dough rope can be cut to form individual shaped pieces.

In still another variation, the cooked cereal dough can be fed to a biscuit forming device (see, for example, U.S. Pat. No. 5,342,188, entitled "Device For Crimping and Cutting Dough Ropes, issued Aug. 30, 1994 to C. E. Zimmermann, which is incorporated herein by reference) which forms the dough into biscuit shaped individual pieces.

In another preferred variation, the cooked cereal dough is formed into individual "O" shaped pieces or rings, biscuits, shreds, figurines, letters, spheres or other geometric shapes, nuggets, or even irregular shapes.

Drying To Form Finished Pieces

The present methods further comprise the step of drying the shaped and sized individual pieces to form finished cereal products fortified with inulin.

The skilled artisan will appreciate that the drying step depends in important part upon the desired end product. For example, for end products in the form of puffable half products or pellets for snack production, the drying step can be practiced to provide a finish moisture content of about 10 to 15%. However, when the desired end product is an R-T-E cereal, drying the pellets to these moisture contents may only be an intermediate or substep prior to, for example, flaking the dried pellets to form "wet" flakes. These "wet" flakes can then be subjected to a finish or final drying step wherein the pieces are dried to final dried moisture contents of 1 to 4% such as by toasting.

In still another variation, the dough can be extruded under conditions of temperature and pressure so as to puff and expand (the "direct expansion" technique) and sectioned or cut into individual pieces to form individual expansions puffed R-T-E cereal or snack pieces.

In another variation, the drying step can involve heating the pieces under conditions that not only dry the piece but also cause the piece to expand to form dried and puffed or flaked finished pieces. For example, pellets can be gun puffed to form dried puffed R-T-E cereal products. The wet flakes can be toasted to dry, expand and tenderize to form finished R-T-E cereal flakes.

The cereal pieces, however formed, can optionally be provided with a topical sugar coating and subsequently dried to remove the added moisture from the sugar coating solution to form presweetened R-T-E finished cereal pieces. In other variations, an oil topical coating optionally with salt and/or flavors, is applied to form finished dried snack products.

In still another variation, the pieces or pellets can be deep fat fried to form dried puffed fried finished cereal products fortified with inulin. Such dried puffed fried finished cereal pieces are especially desirable as fiber fortified snack products. Such products can absorb about 5 to 35% of frying fat during the drying and puffing step.

Since inulin does not require cooking, the inulin can be added either before or after cooking. Conveniently, as described above, inulin can be admixed with other dry cereal ingredients and water which is then cooked to form a cooked cereal dough. The cooked cereal dough fortified with inulin so prepared is then formed into finished farinaceous products.

In commercial practice, one or more of the present methods' steps can be combined and performed in or by a single piece of equipment. For example, a dry mix of cereal ingredients including inulin can be admixed with water and/or steam in a cooker extruder such as a single screw or twin screw. The cooker extruder heats, cooks and works the cereal ingredients to form an inulin containing cooked cereal dough. In one variation, referred to in the art as direct expansion, the extruder conditions are such that upon extrusion, the cooked cereal dough expands and dries and is severed into small pieces to form R-T-E cereal pieces. The R-T-E cereal pieces can be in final form. In slight variations, the R-T-E cereal pieces can be further dried to final moisture contents, especially if a sugar coating is applied.

If desired, the present cereal compositions can be fabricated into presweetened R-T-E cereals such as by the topical application of a conventional sweetener coating. Both conventional sugar coatings and coatings employing high potency sweeteners, especially aspartame and potassium acesulfame, are known and can be used to provide presweetened cereals for use herein.

Surprisingly, all or part of the inulin herein can be topically applied to form a topical coating. Conveniently, the inulin topical application step can be combined with the provision of the finished products herein with a topical sugar or presweetening coating. If the present inulin materials are topically applied in combination with the application of a topical presweetener coating, preferred for use herein are the FOS materials. Such FOS materials are preferred since such FOS materials impart a slightly sweet taste. Also, the FOS materials are highly soluble and lend themselves readily to such topical application.

If employed, the topical sweetening is applied in sufficient amounts such that after drying to remove added moisture associated with the sugar coating solution, the sugar coating is present in a weight ratio of sugar coating to cereal base of about 1:100 to about 50:100, preferably 10:100 to about 40:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

In those variations in which the inulin material is added to the sugar coating, the sugar coating slurry can comprise about 1 to 40% inulin. In other variations, the sugar coating solution is applied as one spray or stream onto the cereal base while simultaneously or concurrently applying the inulin such as in a separate aqueous solution. If added as a separate aqueous solution, then the inulin is present in that solution at its maximum solubility level so as to minimize moisture addition that must be subsequently removed by drying.

The R-T-E cereal pieces so prepared can then be conventionally packaged for distribution and sale.

The R-T-E cereals of the present invention can be consumed in a conventional manner to obtain the nutritional and physiological benefits of a high soluble fiber cereal food. A surprising advantage of the present R-T-E cereals is that the fiber is nearly "invisible," that is, even high levels of fiber are barely organoleptically discernible in the finished product.

Attributes

The finished dried R-T-E cereal and cereal based snack products fabricated from the inulin fortified cooked cereal doughs herein are useful as fiber fortified food products. Surprisingly, the finished R-T-E cereal and cereal based snack products provided herein are remarkably similar to their unfortified counterparts, notwithstanding the presence of the added inulin ingredient. The products are characterized by good flavor, good texture and other favorable organoleptic attributes. Notwithstanding their highly acceptable taste, appearance and texture attributes, the products are nonetheless characterized as having high levels of soluble fiber. Notwithstanding the high levels of soluble fiber, the present finished products are remarkably free of the undesirably slimy mouth feel heretofore associated with finished dried cereal products high in soluble fiber content.

The products can be packaged and distributed in conventional form.

The measurement of total dietary fiber, soluble fiber, and insoluble fiber is subject to disparate analytical methods and values determined thereby. For purposes of the present invention, "soluble" and "insoluble" fiber values are to be determined by an accepted test procedure for fiber developed by Prosky et al. and described in "Determination of Insoluble, Soluble and Total Dietary Fiber in Foods and Food Products," Journal of the Association of Official Analytical Chemists, Vol. 71, No. 5 (1988) which is incorporated herein by reference. The procedure there described involves an enzymatic-gravametric procedure adopted by final action of the AOAC.

EXAMPLE 1

A ready-to-eat cereal composition of the present invention having high levels of soluble fiber is prepared according to the following procedure. A dry blend, a wet blend and a sugar coating composition were separately prepared having the respective formulations:

| A. Dry Base Blend Ingredients | Weight % |
|---|---|
| Whole wheat | 66.92 |
| Inulin | 12.40 |
| White wheat bran | 8.00 |
| Sugar | 7.50 |
| Salt | 1.50 |
| Guar gum | 1.20 |
| Vitamin blend | 0.40 |
| Trisodium phosphate | 0.08 |
| | 100.00% |

| B. Malt Syrup Slurry Ingredients | Weight % |
|---|---|
| Water | 92.00 |
| Cereal malt syrup | 7.90 |
| Food coloring (e.g. Annatto) | 0.10 |
| | 100.00% |

| C. Sugar Slurry Ingredients | Weight % |
|---|---|
| Sugar | 60.00 |
| Water | 28.20 |
| Honey | 6.00 |
| Brown sugar syrup | 5.00 |
| Salt | 0.80 |
| | 100.00% |

About 1000 kg of dry base ingredients are blended for approximately 15 minutes in a conventional ribbon blender. The dry salt and sugar are weighed out separately and added to the malt syrup slurry mixture. The vitamin blend is also weighed out separately. Sufficient quantities of the malt syrup slurry (about 0.5 kg slurry for each kg of dry base mixture), are prepared in a conventional steam jacketed mixing kettle. The dry base and the prepared slurry are then added to a rotating batch cooker. The base and slurry mixture are then rotated for about five minutes to allow adequate mixing. The ingredients are then cooked for 55 minutes at 25 psig (274 kPa) steam pressure with processing vents of pressure after 15 minutes and again after 35 minutes elapsed time. Following cooking, the cooked cereal dough is allowed to cool and is pelletized in a pelletizing extruder (Ambrette Co.). The vitamin blend is metered into the cooled dough prior to pelleting extrusion at a rate sufficient to result in a final concentration in the cereal of 0.36%. The pellets are then dried in a conventional pellet dryer to a final moisture of 23 to 27%, with a target moisture of 25%. The dried pellets are then tempered for 45 to 60 minutes at ambient temperature in a conventional tempering belt system. The tempered pellets are then flaked using standard cereal flaking equipment to a thickness of about 0.018 to 0.023 inches 457 to 584 μm). The wet flakes are then toasted at 204.4° C. (400° F.) in a cereal toaster. The toasted flakes are then coated with sufficient sugar slurry to produce a final product with approximately 10% added slurry.

The final product has a soluble fiber content of 3.3 g/oz and an insoluble fiber content of 3.2 g/oz. The total fat content is less than 2%. Upon consumption, the R-T-E cereal will exhibit a pleasing, typical bran cereal flavor and texture profile, without a gummy or slimy mouth feel.

What is claimed is:

1. A food product with supplemental dietary fiber, comprising:
   A. about 83 to 97% (dry weight) of a cooked cereal dough;
   B. about 3 to 17% by weight of the food product of added β-2 fructofuranose; and
   C. a sugar coating, with at least a portion of the β-2 fructofuranose being topically applied along with the sugar coating on the food product to define an overall product coating, wherein the β-2 fructofuranose constitutes 1–40% of the overall product coating.

2. The food product of claim 1 wherein β-2 fructofuranose is supplied by polymers and oligomers of β-2 fructofuranose.

3. The food product of claim 2 wherein the β-2 fructofuranose is provided by inulin, fructoogliosaccharides derived from chicory, and mixtures thereof and wherein the total level of β-2 fructofuranose ranges from about 4 to 11% (dry weight).

4. The food product of claim 3 wherein at least a portion of the β-2 fructofuranose is admixed with the cooked cereal dough.

5. The food product of claim 4 wherein the β-2 fructofuranose is provided by inulin.

6. The food product of claim 4 wherein the food product has a moisture content of about 1 to 5%.

7. The food product of claim 5 wherein the food product is a cooked cereal dough having a moisture content of about 15 to 30%.

8. The food product of claim 7 in the form of pellets.

9. The food product of claim 8 having been dried to a moisture content of about 10 to 20%.

10. The food product of claim 5 wherein the food product is a puffed snack prepared by deep fat frying having a moisture content of about 1 to 5%.

11. The food product of claim 9 wherein the cooked cereal dough is puffable.

12. The food product of claim 5 wherein the food product is a puffed snack prepared by microwave heating or hot air puffing.

13. A method for preparing a fiber fortified food product comprising the steps of:
   A. providing a cooked cereal dough;
   B. fortifying the cooked cereal dough with about 1 to 17% by weight (dry basis) of a β-2 fructofuranose;
   C. forming the cooked cereal dough into sized shapes and pieces;
   D. drying the pieces to a water activity of about 0.1 to 0.30 to form dried cereal pieces; and
   E. providing a sugar coating to the pieces, with at least a portion of the β-2 fructofuranose being applied topically along with the sugar coating as an overall coating, wherein the β-2 fructofuranose constitutes 1–40% of the overall coating.

14. The method of claim 13 wherein at least a portion of the fortification involves admixing the β-2 fructofuranose with the cooked cereal dough.

15. The method of claim 13 further comprising providing at least 2 g/oz (2 g/24.8 g) of the β-2 fructofuranose.

16. The method of claim 15 wherein step B includes adding at least a portion of inulin to the dough after cooking.

17. The method of claim 14 wherein the moisture content of the cooked cereal dough ranges from about 10 to 35% by weight.

18. The method of claim 13 wherein in step C, the method includes the substep of forming flaked pieces, and wherein in step D, the method includes the substep of toasting the flaked pieces to form toasted, dried flaked ready-to-eat (R-T-E) pieces.

19. The method of claim 13 wherein step D comprises microwave heating or hot air puffing of the food product to produce a puffed snack.

20. The product prepared by the method of claim 13.

21. The product prepared by the method of claim 18.

22. The product prepared by the method of claim 18.

23. The method of claim 18 wherein the β-2 fructofuranose includes inulin.

24. The method of claim 23 wherein the cooked cereal dough includes whole wheat.

25. The method of claim 17 wherein step D comprises deep fat frying whereby the dried pieces are puffed to form puffed fried snack pieces.

26. In a ready-to-eat (R-T-E) cereal product fabricated from a cooked cereal dough, the improvement comprising:
   about 0.1 to 10% by weight of a β-2 fructofuranose; and
   a sugar coating, with at least a portion of the β-2 fructofuanose being topically applied on the R-T-E cereal product along with the sugar coating to define an overall product coating, wherein the β-2 fructofuranose constitutes 1–40% of the overall product coating.

27. The R-T-E cereal product of claim 26 wherein the β-2 fructofuranose is provided by inulin, fructoogliosaccharides derived from chicory, and mixtures thereof.

28. The R-T-E cereal product of claim 27 wherein at least a portion of the β-2 fructofuranose is admixed with the cooked cereal dough.

29. The R-T-E cereal product of claim 28 wherein the β-2 fructofuranose is provided by inulin.

30. The R-T-E cereal product of claim 26 wherein at least a portion of the β-2 fructofuranose is present in the sugar coating.

31. The R-T-E cereal product of claim 26 wherein the β-2 fructofuranose is inulin.

32. In a food product fabricated from a cooked cereal dough having a soluble fiber content of about 1 to 10 g per ounce, the improvement comprising: at least a portion of the soluble fiber being supplied by a β-2 fructofuranose and the food product including a sugar coating, with a percentage of the β-2 fructofuranose being topically applied on the food product along with the sugar coating to define an overall product coating, wherein the β-2 fructofuranose constitutes 1–40% of the overall product coating.

33. The food product of claim 32 wherein the food product is a puffed snack product prepared by deep fat frying of a product fabricated from a cooked cereal dough.

34. The food product of claim 32 wherein the food product is a grain based snack prepared by deep fat frying products fabricated from the cooked cereal dough.

* * * * *